(12) United States Patent
Radecky et al.

(10) Patent No.: US 10,450,148 B2
(45) Date of Patent: Oct. 22, 2019

(54) CONVEYOR SYSTEM

(71) Applicant: Fire Catt, LLC, Troy, MI (US)

(72) Inventors: Marc Radecky, Troy, MI (US);
Zachary Savas, Bloomfield Hills, MI (US)

(73) Assignee: Fire Catt, LLC, Troy, MI (US)

( * ) Notice: Subject to any disclaimer, the term of this patent is extended or adjusted under 35 U.S.C. 154(b) by 0 days.

(21) Appl. No.: 15/954,314

(22) Filed: Apr. 16, 2018

(65) Prior Publication Data

US 2018/0297790 A1 Oct. 18, 2018

Related U.S. Application Data

(60) Provisional application No. 62/486,201, filed on Apr. 17, 2017.

(51) Int. Cl.
| | | |
|---|---|---|
| *B65G 47/80* | (2006.01) | |
| *B65G 15/28* | (2006.01) | |
| *B65G 41/00* | (2006.01) | |
| *B65G 21/12* | (2006.01) | |

(52) U.S. Cl.
CPC ............ *B65G 47/80* (2013.01); *B65G 15/28* (2013.01); *B65G 41/002* (2013.01); *B65G 21/12* (2013.01); *B65G 41/005* (2013.01); *B65G 41/008* (2013.01); *B65G 2201/0217* (2013.01); *B65G 2201/0232* (2013.01); *B65G 2201/0276* (2013.01); *B65G 2812/14* (2013.01)

(58) Field of Classification Search
CPC ...... B65G 47/80; B65G 41/008; B65G 15/28; B65H 29/00; B65H 20/006; B65H 29/16

USPC ............ 198/860.1, 861.1; 242/533.8, 535.4, 242/541.3
See application file for complete search history.

(56) References Cited

U.S. PATENT DOCUMENTS

| | | | | |
|---|---|---|---|---|
| 1,461,707 A | * | 7/1923 | Hanson ................ | B65G 41/003 198/861.5 |
| 1,790,582 A | * | 1/1931 | Graham et al. ......... | B29C 43/24 198/602 |
| 2,425,860 A | * | 8/1947 | Brady .................. | B65G 41/002 198/318 |
| 3,474,980 A | * | 10/1969 | Mann, Jr. ........... | B65H 19/2276 242/533.3 |
| 3,623,677 A | * | 11/1971 | Appleby ............ | B29D 30/3007 156/361 |
| 5,427,327 A | * | 6/1995 | Anderson ............... | B21C 47/32 242/362 |
| 6,536,702 B1 | * | 3/2003 | Vargo ..................... | B65H 18/22 242/530.2 |

(Continued)

OTHER PUBLICATIONS https://www.accessconstructionequipment.com/products/portable-conveyors/portable-mini-conveyors.html.

*Primary Examiner* — James R Bidwell
(74) *Attorney, Agent, or Firm* — Honigman LLP

(57) ABSTRACT

A conveyor system includes a conveyor, a support structure, and a staging structure. The conveyor includes a proximal end and a distal end and is operable to move an item from the proximal end to the distal end. The support structure includes a first leg and a second leg. The first leg supports the proximal end of the conveyor. The second leg supports the distal end of the conveyor. The staging structure is disposed at the proximal end of the conveyor and includes a turntable operable to rotate about a first axis.

20 Claims, 1 Drawing Sheet

(56) References Cited

U.S. PATENT DOCUMENTS

| | | | |
|---|---|---|---|
| 7,114,615 B1* | 10/2006 | Karpy | B65G 21/20 198/860.1 |
| 8,162,251 B2* | 4/2012 | Vaughn | B65H 18/22 242/535.4 |
| 8,505,845 B2* | 8/2013 | Zink | B65H 75/403 242/390.3 |
| 9,616,624 B1* | 4/2017 | Blier | B29C 73/00 |
| 2005/0115809 A1* | 6/2005 | Lutz | B65G 1/023 198/860.1 |
| 2016/0159606 A1* | 6/2016 | Smith | B65H 49/32 242/533.8 |

* cited by examiner

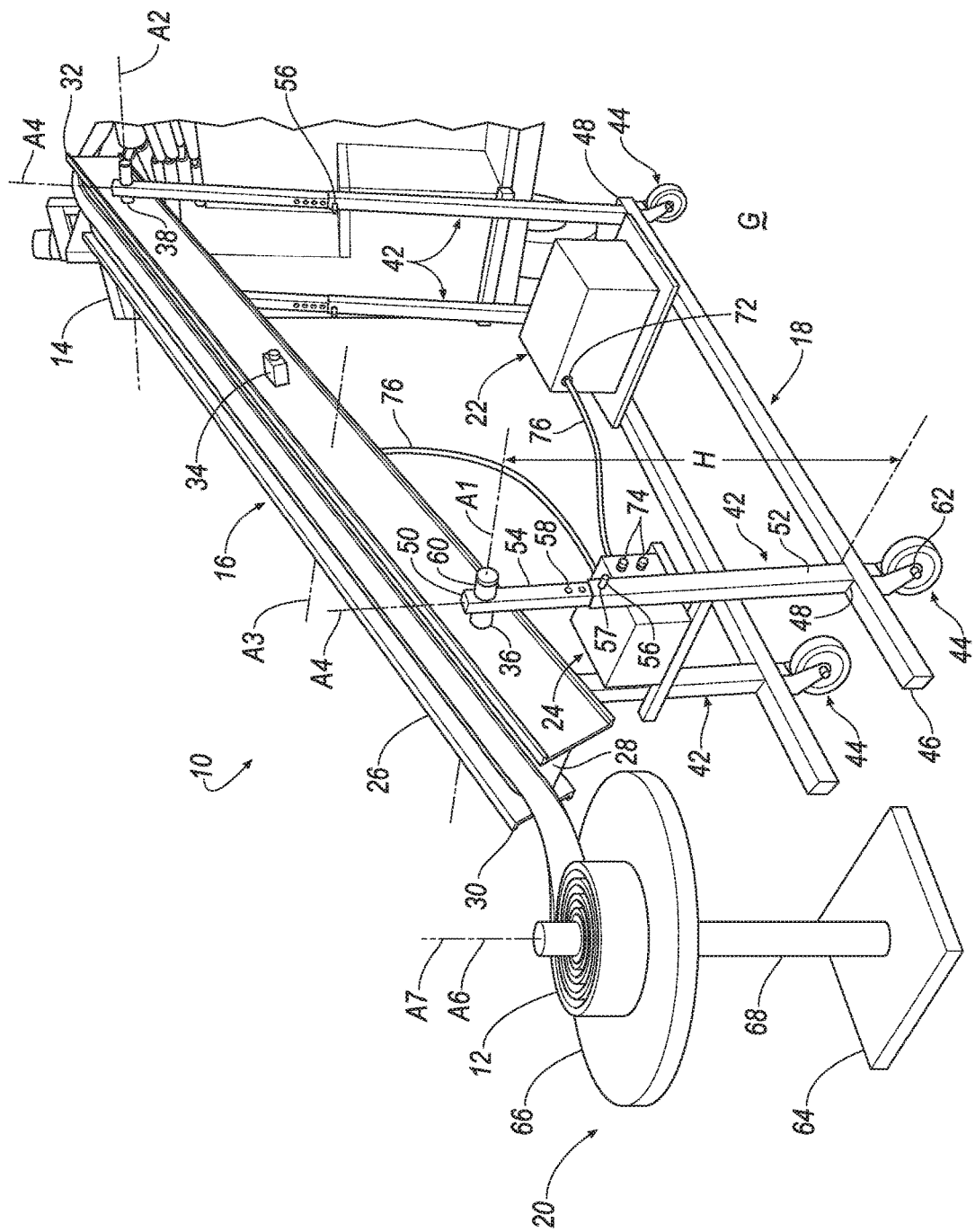

CONVEYOR SYSTEM

CROSS REFERENCE TO RELATED APPLICATIONS

This U.S. patent application claims priority under 35 U.S.C. § 119(e) to U.S. Provisional Application 62/486,201, filed on Apr. 17, 2017, the disclosure of which is considered part of the disclosure of this application and is hereby incorporated by reference in its entirety.

FIELD

The present disclosure relates generally to a conveyor system, and more particularly to a conveyor system for moving an item from a first location to a second location.

BACKGROUND

This section provides background information related to the present disclosure and is not necessarily prior art.

Conveyor systems are used to move items from one location to another location. For example, a conveyor belt may be used to move an item from a first location at a first height to a second location at a second height that is different (e.g., higher or lower) than the first height. While known conveyor systems have proven acceptable for their intended purposes, a continuous need for improvement remains in the relevant art.

SUMMARY

This section provides a general summary of the disclosure, and is not a comprehensive disclosure of its full scope or all of its features.

One aspect of the disclosure provides a conveyor system. The conveyor system may include a conveyor, a support structure, and a staging structure. The conveyor may include a proximal end and a distal end and may be operable to move an item from the proximal end to the distal end. The support structure may include a first leg and a second leg. The first leg may support the proximal end of the conveyor, and the second leg may support the distal end of the conveyor. The staging structure may be disposed at the proximal end of the conveyor and may include a turntable operable to rotate about a first axis.

Implementations of the disclosure may include one or more of the following optional features. In some implementations, the second leg includes a primary member and a secondary member coupled to the primary member for translation along a second axis. The second axis may extend in a vertical direction relative to a ground surface. The second axis may be parallel to the first axis.

In some implementations, the first leg is pivotally coupled to the conveyor. The first leg may include a primary member and a secondary member coupled to the primary member for translation along a second axis. The second leg may include a primary member and a secondary member coupled to the primary member of the second leg for translation along a third axis. The second axis may be parallel to the third axis.

In some implementations, the conveyor includes a belt operable to orbit about a second axis. The second axis may be transverse to the first axis. The second axis may be perpendicular to the first axis. The conveyor may include a driver operable to drive the belt about the second axis. In some implementations, the conveyor system includes a control system in communication with the driver, and a power source in communication with the control system.

Another aspect of the disclosure provides a conveyor system. The conveyor system may include a conveyor, a support structure, and a staging structure. The conveyor may include a proximal end and a distal end and may be operable to move an item from the proximal end to the distal end. The support structure may include a first leg supporting the distal end of the conveyor. The first leg may include a primary member and a secondary member coupled to the primary member for translation along a first axis. The staging structure may be disposed at the proximal end of the conveyor and may include a turntable operable to rotate about a second axis.

This aspect may include one or more of the following optional features. In some implementations, the second axis extends in a vertical direction relative to a ground surface. The second axis may be parallel to the first axis.

In some implementations, the support structure includes a second leg supporting the proximal end of the conveyor. The second leg may be pivotally coupled to the conveyor. In some implementations, the second leg includes a primary member and a secondary member coupled to the primary member of the second leg for translation along a third axis.

In some implementations, the conveyor includes a belt operable to orbit about a third axis. The third axis may be transverse to the second axis.

Yet another aspect of the disclosure provides a method of conveying a hose from a first location to a second location. The method may include placing a first end of the hose on a portion of a conveyor belt. The portion may be disposed at a proximal end of the conveyor belt. The method may also include orbiting the conveyor belt about a first axis. The method may further include conveying the first end of the hose and the portion of the conveyor belt from the proximal end of the conveyor belt to a distal end of the conveyor belt.

This aspect may include one or more of the following optional features. In some implementations, the method includes rotating the conveyor belt about a second axis extending transverse to the first axis. The second axis may be perpendicular to the first axis.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected configurations and not all possible implementations, and are not intended to limit the scope of the present disclosure.

FIG. 1 is a perspective view of a conveyor system in accordance with the principles of the present disclosure.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

With reference to FIG. 1, a conveyor system 10 in accordance with the principles of the present disclosure is shown. As will be explained in more detail below, in some implementations, the conveyor system 10 may be used to move an item 12 (e.g., a fire hose) from a first location to a second location. For example, the conveyor system 10 may be used to move the item 12 from the ground G, or another location, to a vehicle 14 (e.g., a fire truck).

The conveyor system 10 may include a conveyor 16, a support structure 18, a staging structure 20, a power source 22, and a control system 24. The conveyor 16 may include a frame 26, a motor (not shown), and a belt 28. The frame 26 may extend from a proximal end 30 to a distal end 32 and may include a plurality of rollers (not shown), a switch 34, a first pivot feature 36, and a second pivot feature 38. In some implementations, the distance between the proximal end 30 and the distal end 32 is ten feet. It will be appreciated, however, that the distance between the proximal end 30 and the distal end 32 may be more or less than ten feet within the scope of the present disclosure.

The switch 34 may be in communication with the power source 22 or the control system 24 to control the delivery of power from the power source 22 or the control system 24 to the motor. For example, the switch 34 may be a kill switch operable to terminate the delivery of power from the power source 22 or the control system 24 to the motor, and thus terminate rotation of the rollers and the belt 28.

The first pivot feature 36 may include an aperture, an axle, or other suitable feature defining a first axis of rotation A1. The second pivot feature 38 may include a hub, an axle, or other suitable feature defining a second axis of rotation A2. The first pivot feature 36 may be disposed at the proximal end 30 of the frame 26, and the second pivot feature 38 may be disposed at the distal end 32 of the frame 26. In some implementations, the first and second pivot features 36, 38 each define a hub. The first axis of rotation A1 may be parallel to the second axis of rotation A2.

The belt 28 may be supported by the rollers (not shown), such that rotation of the rollers causes the belt 28 to orbit about an axis A3 relative to a portion of the frame 26, and thereby move from the proximal end 30 to the distal end 32 and vice versa. In some implementations, the axis A3 extends horizontally (e.g., parallel to the ground G). The belt 28 may be formed from a polymer material (e.g., rubber). It will be appreciated, however, that the belt 28 may be formed from other materials within the scope of the present disclosure.

The support structure 18 may include a plurality of legs 42 and a plurality of wheels 44. In some implementations, the support structure may include four legs 42 and four wheels 44. For example, the support structure 18 may include two legs 42 disposed at a proximal end 46 of the support structure 18 and two legs 42 disposed at a distal end 46 of the support structure 18. It will be appreciated, however, that the support structure 18 may include more or less than four legs within the scope of the present disclosure. For example, in some implementations, the support structure 18 may include one leg 42 disposed at the proximal end 46 of the support structure 18 and one leg disposed at the distal end 46 of the support structure 18.

Each leg 42 may define a define a height H extending from a proximal end 48 of the leg 42 to a distal end 50 of the leg 42. In some implementations, the height H of each leg 42 is adjustable, such that the distance between the proximal end 48 and the distal end 50 can be increased or decreased. In this regard, each leg 42 may include a primary member 52 and a secondary member 54. The secondary member 54 may be adjustably coupled to the primary member 52. For example, the secondary member 54 may be disposed within the primary member 52, or vice versa, for translation along an axis A4. In some implementations, the axis A4 extends vertically (e.g., perpendicular to the ground G) along each leg 42.

Each leg 42 may also include a locking member 56 for securing the location of the secondary member 54 relative to the primary member 52. In some implementations, the locking member 56 includes a pin disposed within an aperture 57 of the primary member 52 and an aperture 58 of the secondary member 54. For example, the locking member 56 may be removably disposed within one or more of the aperture of the primary member 52 and the aperture 58 of the secondary member 54, such that removal of the locking member 56 allows the secondary member 54 to translate (e.g., telescope) relative to the primary member 52 along the axis A4.

Each leg 42 may be pivotally coupled to the conveyor 16. In this regard, each leg 42 may include a pivot feature 60. The pivot feature 60 may include an aperture, an axle, or other suitable feature defining an axis of rotation A5. In the assembled configuration, the pivot feature 60 may be pivotally coupled to one of the first and second pivot features 36, 38 of the conveyor 16, such that the axis of rotation A5 is aligned with one of the axes of rotation A1, A2. For example, in some implementations, the pivot feature 60 includes an axle pivotally disposed within an aperture defined by the first or second pivot features 36, 38. Accordingly, as will be explained in more detail below, translation of the secondary member 54 of the leg 42 relative to the primary member 52 of the leg 42 may cause the conveyor 16 to pivot about the pivot features 36, 38, 60 relative to one or more of the legs 42.

The wheels 44 may be removably coupled to the support structure 18. For example, in some implementations, each wheel 44 includes a pin 62 (e.g., a linchpin, a cotter pin, a spring pin) securing the wheel 44 to a portion (e.g., an axle) of the support structure 18. The wheels 44 may allow a user to move a portion of the conveyor system 10 (e.g, the conveyor 16, the support structure 18, the power source 22, or the control system 24) relative to the ground G or the vehicle 14. The wheels 44 may each define a diameter greater than eight inches. In some implementations, each wheel 44 defines a diameter greater than twelve inches. The wheels 44 may be manufactured from a lightweight plastic material. In some implementations, the wheels 44 are formed in a blow molding manufacturing process.

The staging structure 20 may include a support portion 64 and a turntable portion 66. The support portion 64 may include one or more vertically-extending legs 68 and a rotation feature (e.g., a hub, an axle, etc.) defining an axis of rotation A6. The axis of rotation A6 may extend in a direction transverse to the axis A3. For example, in some implementations, the axis A6 extends in a direction perpendicular to the axis A3. It will be appreciated, however, that the axis A6 may extend in other directions within the scope of the present disclosure. For example, in some implementations, the axis A6 may extend in a direction substantially parallel to the axis A3. In this regard, in some implementations, the axis A6 may extend in a horizontal direction.

The turntable portion 66 may be removably and/or rotatably coupled to the support portion 64. In some implementations, the turntable portion 66 defines a substantially circular shape or construct defining an axis of rotation A7. In the assembled configuration, the axis A7 of the turntable portion 66 may be aligned with (e.g., parallel to) the axis A6 of the support portion 64. In this regard, the turntable portion 66 may be supported by the support portion 64 for rotation about the axes A6, A7. The turntable portion 66 may be disposed a distance less than twelve inches from the ground G in a direction extending substantially perpendicular to the ground G. In some implementations, the turntable is disposed five inches from the ground G in the direction extending substantially perpendicular to the ground G.

The power source 22 may include a battery, a generator, or other suitable source of electrical power. For example, the power source 22 may include a 120V gasoline-powered generator having a power outlet 72. In some implementations, the power outlet 72 is a ground fault circuit interrupter power outlet. During operation, the power source 22 may supply electrical power to the control system 24 and/or the conveyor 16. For example, in some implementations, the power source 22 supplies electrical power to the conveyor 16 through the control system 24.

The control system 24 may include a control module (not shown) for controlling one or more operational characteristics (e.g., ON, OFF, speed, acceleration, etc.) of the conveyor 16. In this regard, the control system 24 may include one or more user input members 74 (e.g., buttons) in communication with the control module to direct the control module to instruct the conveyor 16, or portion (e.g., the motor or other driver causing the belt 28 to orbit about the axis A3) thereof, to operate according to various characteristics. For example, the user input members 74 may include an ON/OFF button, a speed button, or an acceleration button in communication with the control module to control the operation of the motor or other driver causing the belt 28 to orbit about the axis A3.

The control system 24 may be in wired communication with the power source 22 and the conveyor 16 (e.g., the motor or other driver causing the belt 28 to orbit about the axis A3). For example, the system 10 may include one or more cords 76 extending from the power source 22 to the control system 24 and from the control system 24 to the conveyor 16 to provide electrical power to the conveyor 16 from the power source 22.

With continued reference to FIG. 1, a method of using the conveyor system 10 will now be described. As will be described, the conveyor system 10 may be utilized to move the item 12 from a first location (e.g., the ground G or the staging structure 20) to a second location (e.g., the vehicle 14). In this regard, the staging structure 20 may be disposed at or proximate to the proximal end 30 of the conveyor 16, and the vehicle 14 may be disposed at the distal end 32 of the conveyor 16. In some implementations, the proximal end 30 is disposed at a first height and the distal end 32 is disposed at a second height that is greater than the first height.

During operation, power may be supplied to the conveyor 16 (e.g., the motor or other driver) through the power source 22 and the control system 24, causing the belt 28 to orbit about the axis A3. The item 12 may be disposed on one of the ground G or the staging structure 20. In some implementations, the item 12 is disposed on the turntable portion 66 of the staging structure 20 about the axes A6, A7. For example, the item 12 (e.g., a firehose) may be coiled about the axes A6, A7.

A user may place a portion of the item 12 (e.g., an end of a firehose) on the belt 28 of the conveyor 16. For example, the user may place an end of the item 12 on the belt 28 proximate to the proximal end 30. As the belt 28 orbits about the axis A3, the belt 28 may carry the item 12 from the proximal end 30 to the distal end 32 and to the vehicle 14. As the item 12 is carried from the proximal end 30 to the distal end 32, a portion of the item 12 (e.g., a coiled portion) may rotate about the axes A6, A7. In some implementations, the item 12 may rotate with the turntable portion 66 about the axes A6, A7. During operation, the belt 28 may continue to move the item 12 from the staging structure 20 to the vehicle 14 until the item has been completely moved from the staging structure 20 and the belt 28 to the vehicle 14.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

What is claimed is:

1. A conveyor system comprising:
   a conveyor having a proximal end and a distal end and operable to move an item from the proximal end to the distal end;
   a support structure having a first leg and a second leg, the first leg supporting the proximal end of the conveyor, the second leg supporting the distal end of the conveyor, and the first leg and the second leg being vertically translatable relative to a ground surface; and
   a staging structure disposed at the proximal end of the conveyor and having a turntable operable to rotate about a first axis.

2. The conveyor system of claim 1, wherein the second leg includes a primary member and a secondary member coupled to the primary member for translation along a second axis.

3. The conveyor system of claim 2, wherein the second axis extends in a vertical direction relative to a ground surface.

4. The conveyor system of claim 2, wherein the second axis is parallel to the first axis.

5. The conveyor system of claim 1, wherein the first leg is pivotally coupled to the conveyor.

6. The conveyor system of claim 5, wherein the first leg includes a primary member and a secondary member coupled to the primary member for translation along a second axis.

7. The conveyor system of claim 6, wherein the second leg includes a primary member and a secondary member coupled to the primary member of the second leg for translation along a third axis.

8. The conveyor system of claim 7, wherein the second axis is parallel to the third axis.

9. The conveyor system of claim 1, wherein the conveyor includes a belt operable to orbit about a second axis.

10. The conveyor system of claim 9, wherein the second axis is transverse to the first axis.

11. The conveyor system of claim 9, wherein the conveyor includes a driver operable to drive the belt about the second axis, the conveyor system further comprising a control system in communication with the driver, and a power source in communication with the control system.

12. A conveyor system comprising:
    a conveyor having a proximal end and a distal end and operable to move an item from the proximal end to the distal end;
    a support structure having a first leg supporting the distal end of the conveyor and including a primary member and a secondary member coupled to the primary member for translation along a first axis relative to the primary member, the first axis extending in a vertical direction relative to a ground surface; and
    a staging structure disposed at the proximal end of the conveyor and having a turntable operable to rotate about a second axis.

13. The conveyor system of claim 12, wherein the second axis extends in a vertical direction relative to a ground surface.

14. The conveyor system of claim 12, wherein the second axis is parallel to the first axis.

15. The conveyor system of claim 12, wherein the support structure includes a second leg supporting the proximal end of the conveyor.

16. The conveyor system of claim 15, wherein the second leg is pivotally coupled to the conveyor.

17. The conveyor system of claim 12, wherein the conveyor includes a belt operable to orbit about a third axis.

18. The conveyor system of claim 17, wherein the third axis is transverse to the second axis.

19. A method of conveying a hose from a first location to a second location:
    placing a first end of the hose on a portion of a conveyor belt, the portion being disposed at a proximal end of the conveyor belt;
    orbiting the conveyor belt about a first axis;
    vertically translating a primary leg member relative to a secondary leg member coupled to the primary leg member such that the proximal end is a first vertical distance from a ground surface and a distal end of the conveyor belt is a second vertical distance from the ground surface, the second vertical distance being greater than the first vertical distance; and
    conveying the first end of the hose and the portion of the conveyor belt from the proximal end of the conveyor belt to a distal end of the conveyor belt.

20. The method of claim 19, further comprising rotating the conveyor belt about a second axis extending transverse to the first axis.

* * * * *